United States Patent
Park

(10) Patent No.: US 11,695,464 B2
(45) Date of Patent: Jul. 4, 2023

(54) METHOD FOR INTELLIGENTLY TRANSMITTING AND RECEIVING SIGNAL AND DEVICE L'HEREOF

(71) Applicant: LG ELECTRONICS INC., Seoul (KR)

(72) Inventor: Jongwon Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 17 days.

(21) Appl. No.: 17/161,485

(22) Filed: Jan. 28, 2021

(65) Prior Publication Data

US 2021/0242928 A1 Aug. 5, 2021

(30) Foreign Application Priority Data

Feb. 3, 2020 (KR) .................. 10-2020-0012470

(51) Int. Cl.
*H04B 7/08* (2006.01)
*G06N 20/00* (2019.01)
*H04B 17/318* (2015.01)

(52) U.S. Cl.
CPC .......... *H04B 7/0857* (2013.01); *G06N 20/00* (2019.01); *H04B 7/088* (2013.01); *H04B 17/318* (2015.01)

(58) Field of Classification Search
CPC .... H04B 7/0857; H04B 7/088; H04B 17/318; H04B 7/0695; H04B 7/0408; H04B 7/0617; G06N 20/00; G06N 3/0454; G06N 3/08
See application file for complete search history.

(56) References Cited

U.S. PATENT DOCUMENTS

| | | | |
|---|---|---|---|
| 2013/0072243 A1* | 3/2013 | Yu ................ | H04B 7/0695 455/509 |
| 2019/0081672 A1* | 3/2019 | Hwang ............ | H04B 7/0486 |
| 2020/0028544 A1* | 1/2020 | Bengtsson ....... | H04B 7/0695 |
| 2020/0186229 A1* | 6/2020 | Raghavan ........ | H04B 7/0695 |

* cited by examiner

*Primary Examiner* — Sung S Ahn
(74) *Attorney, Agent, or Firm* — Lee, Hong, Degerman, Kang & Waimey PC

(57) ABSTRACT

An intelligent computing device detects a plurality of candidate beams irradiated from a base station, clusters at least one of the plurality of candidate beams into at least one candidate cluster using a clustering algorithm, selects an optimal beam based on a received signal strength of each candidate beam in the at least one candidate cluster; and receives a signal using the optimal beam, and thus can reduce a beam failure rate by learning user's movement pattern of a UE through machine learning and performing a beam tracking function based on this. At least one of the base station, the UE, the intelligent computing device, and a server can be associated with an artificial intelligence module, an unmanned aerial vehicle (UAV), a robot, an augmented reality (AR) device, a virtual reality (VR) device, devices related to 5G services, etc.

10 Claims, 16 Drawing Sheets

(a)            (b)

METHOD FOR INTELLIGENTLY TRANSMITTING AND RECEIVING SIGNAL AND DEVICE L'HEREOF

CROSS-REFERENCE TO RELATED APPLICATIONS

Pursuant to 35 U.S.C. § 119(a), this application claims the benefit of earlier filing date and right of priority to Korean Patent Application No. 10-2020-0012470, filed on Feb. 3, 2020, the contents of which are hereby incorporated by reference herein in its entirety.

TECHNICAL FIELD

The present invention relates to a method for intelligently transmitting and receiving a signal and an intelligent computing device therefor, and more particularly to a method for intelligently transmitting and receiving a signal using an optimal beam among a plurality of candidate beams and an intelligent computing device therefor.

BACKGROUND

In a mobile communication system, a base station (BS) irradiates a transmit (TX) beam for transmitting a signal toward a user equipment (UE) at a constant period. The UE forms a receive (Rx) beam for receiving a signal from the base station.

The base station discovers an optimal Tx beam that sends a strongest signal to the UE at a constant period among a plurality of candidate Tx beams, and sends a signal to the UE through the optimal Tx beam. The UE discovers an optimal beam that sends a strongest signal to the UE itself at a constant period among a plurality of candidate Tx beams, and receives a signal from the base station through the optimal beam.

However, due to analog characteristics of the beam, since a method for the UE to measure size of the beam uses the existing signal processing technology, it is a problem that accuracy of the beam size measurement is somewhat low.

In addition, since the existing method reacts very sensitively to the measurement accuracy for the size of each beam, a significant difference occurs in signal transmission/reception efficiency depending on which beam is selected. That is, there is a problem in that the wrong optimal beam is selected when a difference in strength between the optimal beam and the left and right beams are not large.

That is, there is a need for beam management in order not to lose quality of a millimeter-band radio link by using a millimeter-wave band radio signal in the 5G NR communication standard. In addition, there is a need for development of an algorithm that is more excellent than the existing beam management performance.

SUMMARY

An object of the present disclosure is to address the above-described and other needs and/or problems.

Another object of the present disclosure is to implement a method for a UE/base station to select a beam optimized for a situation of the UE using a clustering algorithm and to transmit and receive a signal using the selected beam.

In one aspect of the present disclosure, there is provided a method for an intelligent computing device to intelligently receive a signal from a base station, the method comprising detecting a plurality of candidate beams irradiated from the base station; clustering at least one of the plurality of candidate beams into at least one candidate cluster using a clustering algorithm; selecting an optimal beam based on a received signal strength of each candidate beam in the at least one candidate cluster; and receiving a signal using the optimal beam.

The clustering may comprise clustering the at least one candidate beam into the at least one candidate cluster based on reception characteristics of each of the plurality of candidate beams.

The reception characteristics may include a received signal strength indicator (RSSI).

The clustering may comprise determining a K value, that is a number of candidate clusters, based on a distance between the intelligent computing device and the base station, and generating at least one candidate cluster from among the K candidate clusters based on a location of the intelligent computing device.

The method may further comprise measuring a transmission power of the base station; determining a centroid of the at least one candidate cluster using a transmission power value of the base station; and reconfiguring at least one candidate cluster based on the determined centroid.

The method may further comprise monitoring candidate beams adjacent to the at least one candidate cluster; and allowing the adjacent candidate beams to be included in the at least one candidate cluster based on the monitoring result.

In another aspect of the present disclosure, there is provided an intelligent computing device for intelligently receiving a signal from a base station, the intelligent computing device comprising a communication unit configured to detect a plurality of candidate beams irradiated from the base station; and a processor configured to cluster at least one of the plurality of candidate beams into at least one candidate cluster using a clustering algorithm, select an optimal beam based on a received signal strength of each candidate beam in the at least one candidate cluster, and receive a signal using the optimal beam.

The processor may be configured to cluster the at least one candidate beam into the at least one candidate cluster based on reception characteristics of each of the plurality of candidate beams.

The reception characteristics may include a received signal strength indicator (RSSI).

The processor may be configured to determine a K value, that is the number of candidate clusters, based on a distance between the intelligent computing device and the base station, and generate at least one candidate cluster from among the K candidate clusters based on a location of the intelligent computing device.

The processor may be configured to measure a transmission power of the base station, determine a centroid of the at least one candidate cluster using a transmission power value of the base station, and reconfigure at least one candidate cluster based on the determined centroid.

The processor may be configured to monitor candidate beams adjacent to the at least one candidate cluster and allow the adjacent candidate beams to be included in the at least one candidate cluster based on the monitoring result.

In another aspect of the present disclosure, there is provided a method for a base station to intelligently transmit a signal to a user equipment (UE), the method comprising irradiating a plurality of candidate beams to the UE; clustering at least one of the plurality of candidate beams into a candidate cluster based on a location of the UE; transmitting, to the UE, information related to the candidate cluster; and transmitting the signal to the UE through an optimal beam selected by the UE based on reception characteristics of each candidate beam of the candidate cluster.

Effects of a method for intelligently transmitting and receiving a signal according to an embodiment of the present disclosure are described as follows.

The present disclosure can transmit and receive more efficiently signals by allowing the UE to measure both a transmit (Tx) beam of the base station and a receive (Rx) beam of the UE.

The present disclosure can reduce a beam failure rate by learning user's movement pattern of the UE through the machine learning and performing a beam tracking function based on this.

The present disclosure can stably maintain quality of radio link due to an increase in a handover success rate of the UE using learned information.

The present disclosure can efficiently select an optimal beam, that is more suitable for a situation of the UE, from among a plurality of candidate beams using a clustering algorithm.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
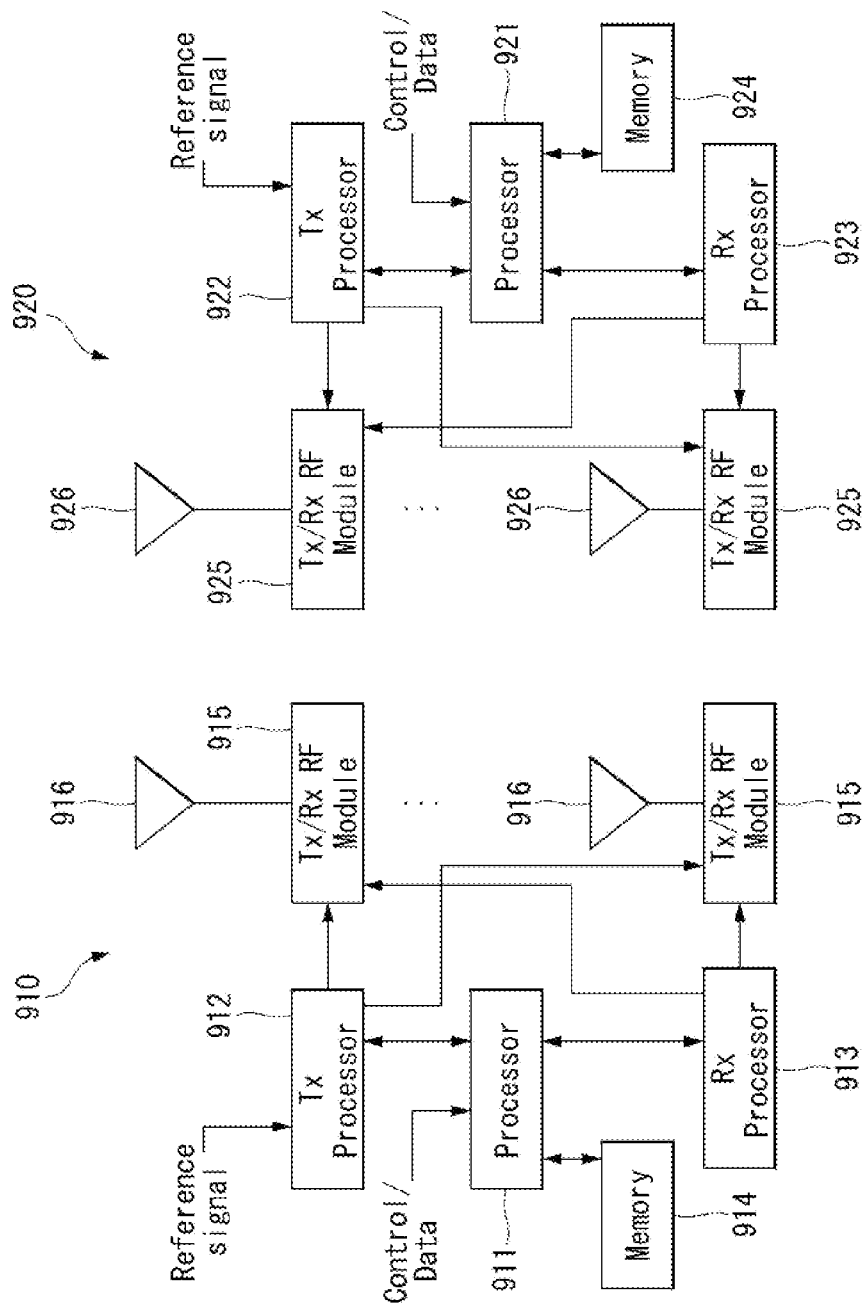
FIG. 1 shows a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
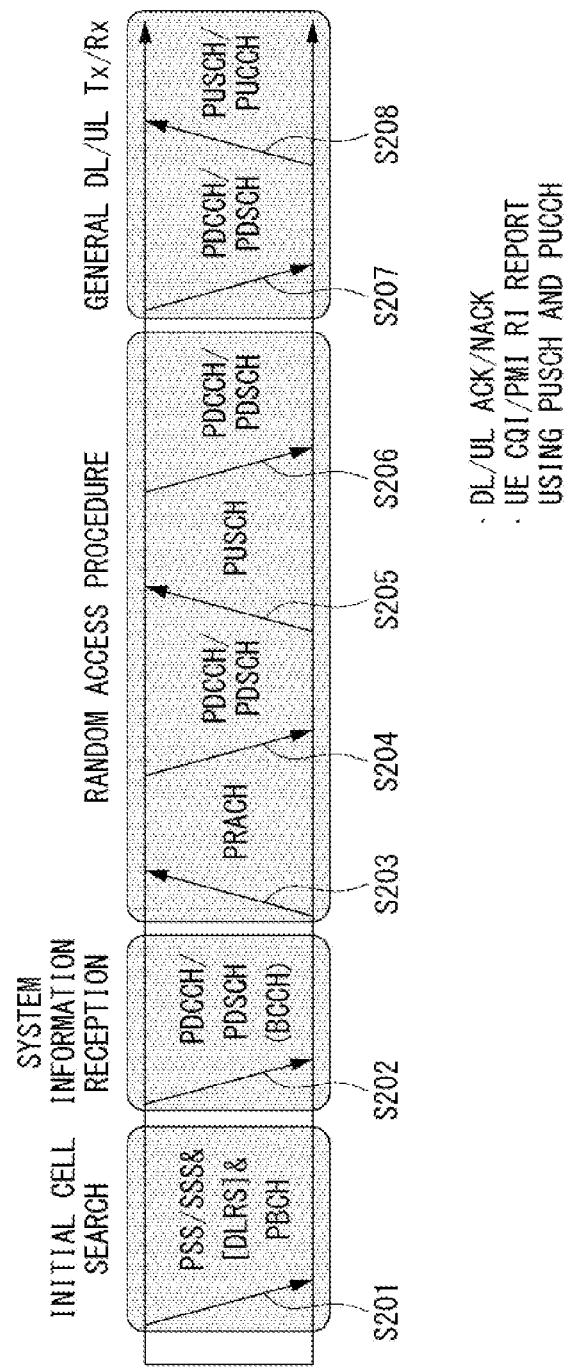
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtain through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-S SB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
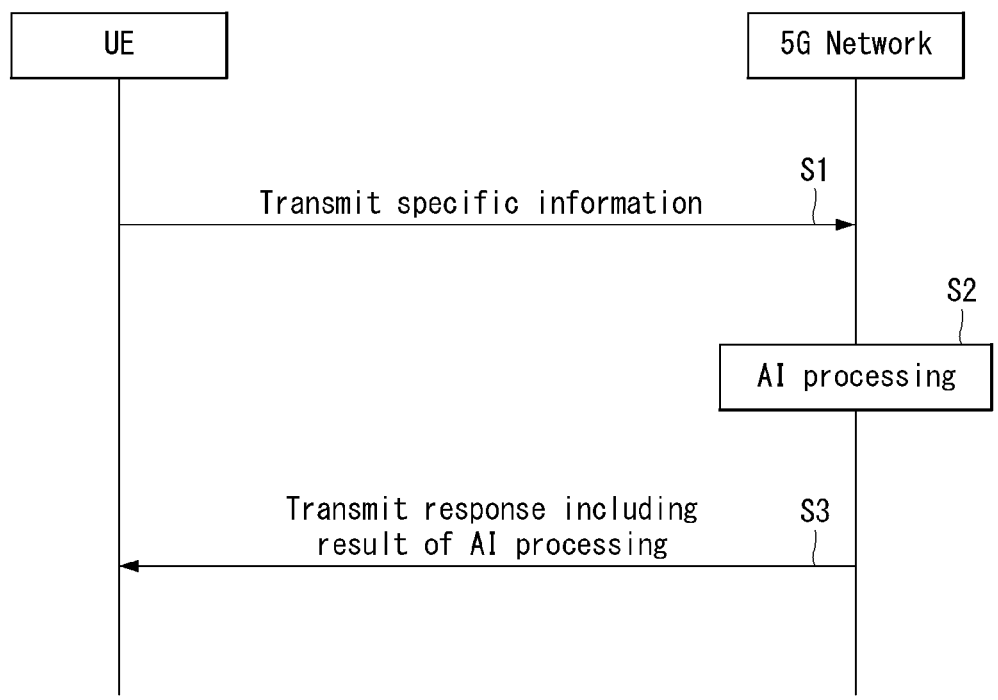
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied operations between UE and 5G network in 5G communication system

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

Figure 4:
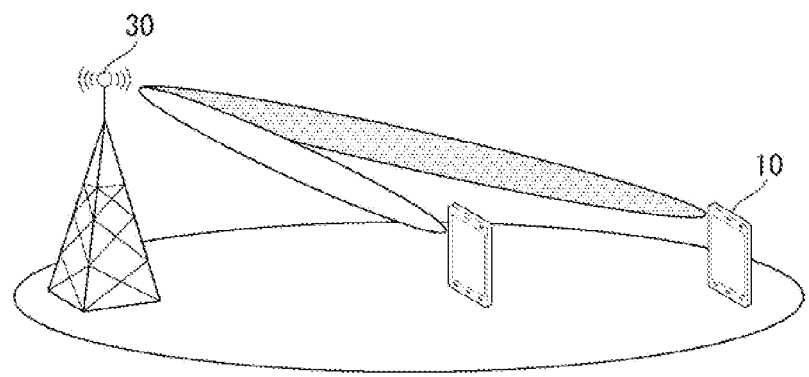
FIG. 4 illustrates a base station and a UE according to an embodiment of the present disclosure.

FIG. 4 illustrates a base station and a UE according to an embodiment of the present disclosure.

A base station 30 may include at least a partial configuration of the first communication device 910 or the second communication device 920 of FIG. 1. The base station 30 may also perform at least a partial function of the 5G network of FIG. 3.

An intelligent computing device 10 may include at least a partial configuration of the first communication device 910 or the second communication device 920 of FIG. 1. The intelligent computing device 10 may also perform at least a partial function of the UE of FIG. 3.

As illustrated in FIG. 4, the base station 30 may send signals to the plurality of intelligent computing devices 10. The base station 30 may send the signal to each intelligent computing device 10 using a pre-selected optimal beam of a plurality of candidate beams.

The intelligent computing device 10 may receive a signal from the base station 30. The intelligent computing device 10 may receive the signal from the base station 30 using a pre-selected optimal beam of a plurality of candidate beams.

Figure 5:
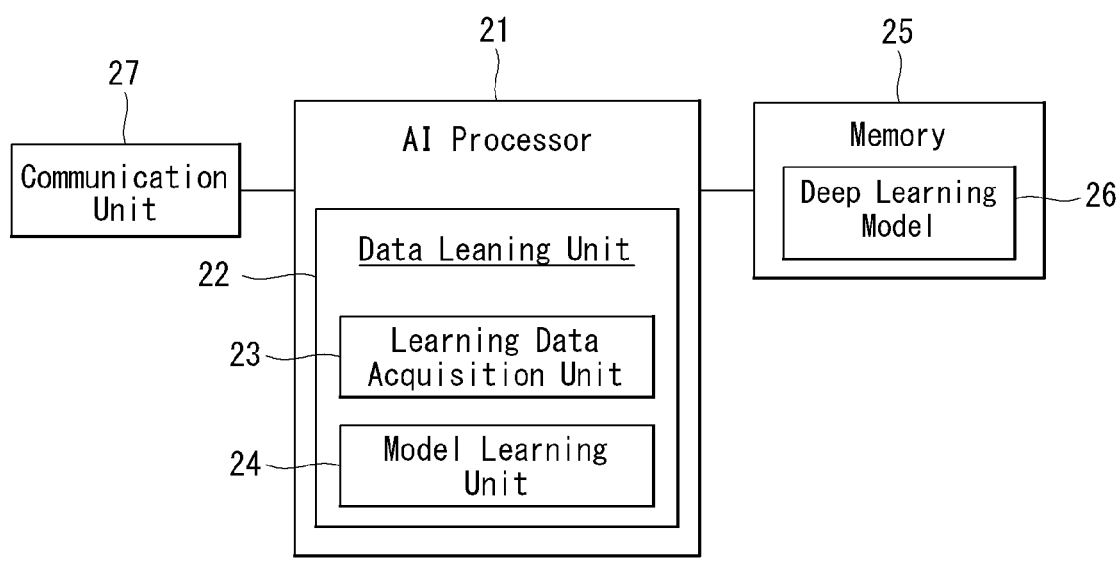
FIG. 5 is a block diagram of an AI device applicable to embodiments of the present disclosure.

FIG. 5 is a block diagram of an AI device applicable to embodiments of the present disclosure.

At least a partial configuration of an AI device 20 may be included in the UE described above with reference to FIGS. 1 to 3.

The AI device 20 may include an electronic device including an AI module that can perform AI processing, or a server including the AI module, and the like. The AI device 20 may be included as at least a partial configuration of the intelligent computing device 10 illustrated in FIG. 4 to perform at least a part of the AI processing.

The AI processing may include all the operations related to optimal beam selection of the intelligent computing device 10 illustrated in FIG. 4. For example, the AI processing may be a process of analyzing data obtained through an input unit of the intelligent computing device 10 and recognizing new data.

The AI device 20 may include an AI processor 21, a memory 25, and/or a communication unit 27.

The AI device 20 is a computing device capable of learning a neural network and may be implemented as various electronic devices such as a server, a desktop PC, a notebook PC, and a tablet PC.

The AI processor 21 may learn a neural network using a program stored in the memory 25.

Particularly, the AI processor 21 may train a neural network for recognizing new data by analyzing data obtained through the input unit. The neural network for recognizing data may be designed to emulate a human brain's structure on a computer, and may include a plurality of network nodes having weights that emulate neurons in a human neural network.

The plurality of network nodes may send and receive data according to each connection relationship so that neurons emulate the synaptic activity of neurons sending and receiving signals through synapses. Herein, the neural network may include a deep learning model which has evolved from a neural network model. In the deep learning model, a plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present invention.

The AI processor 21 may further include a data learning unit 22 for learning a neural network for data classification/recognition. The data learning unit 22 may learn criteria as to which learning data is used to determine the data classification/recognition and how to classify and recognize data using learning data. The data learning unit 22 may learn a deep learning model by acquiring learning data to be used in the learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, data to be input to a neural network model and/or feature values extracted from the data.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process acquired data so that the acquired data can be used in learning for recognizing new data. For example, the learning data pre-processing unit may process acquired learning data into a predetermined format so that the model learning unit 24 can use the acquired learning data in learning for recognizing new data.

Moreover, the learning data selection unit may select data required for learning among learning data acquired by the learning data acquisition unit 23 or learning data pre-processed by the pre-processing unit. The selected learning data may be provided to the model learning unit 24. For example, the learning data selection unit may detect a specific area among feature values of data acquired by the intelligent computing device 10 to select, as learning data, only data for syllable included in the specific area.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may send an external electronic device a result of the AI processing by the AI processor 21.

If the AI processor 21 is included in a network system, the external electronic device may be an intelligent computing device according to an embodiment of the present disclosure.

Although the AI device 20 illustrated in FIG. 5 is described such that it is functionally separated into the AI processor 21, the memory 25, the communication unit 27, etc., the above components may be integrated into one module and may be referred to as an AI module.

Figure 6:
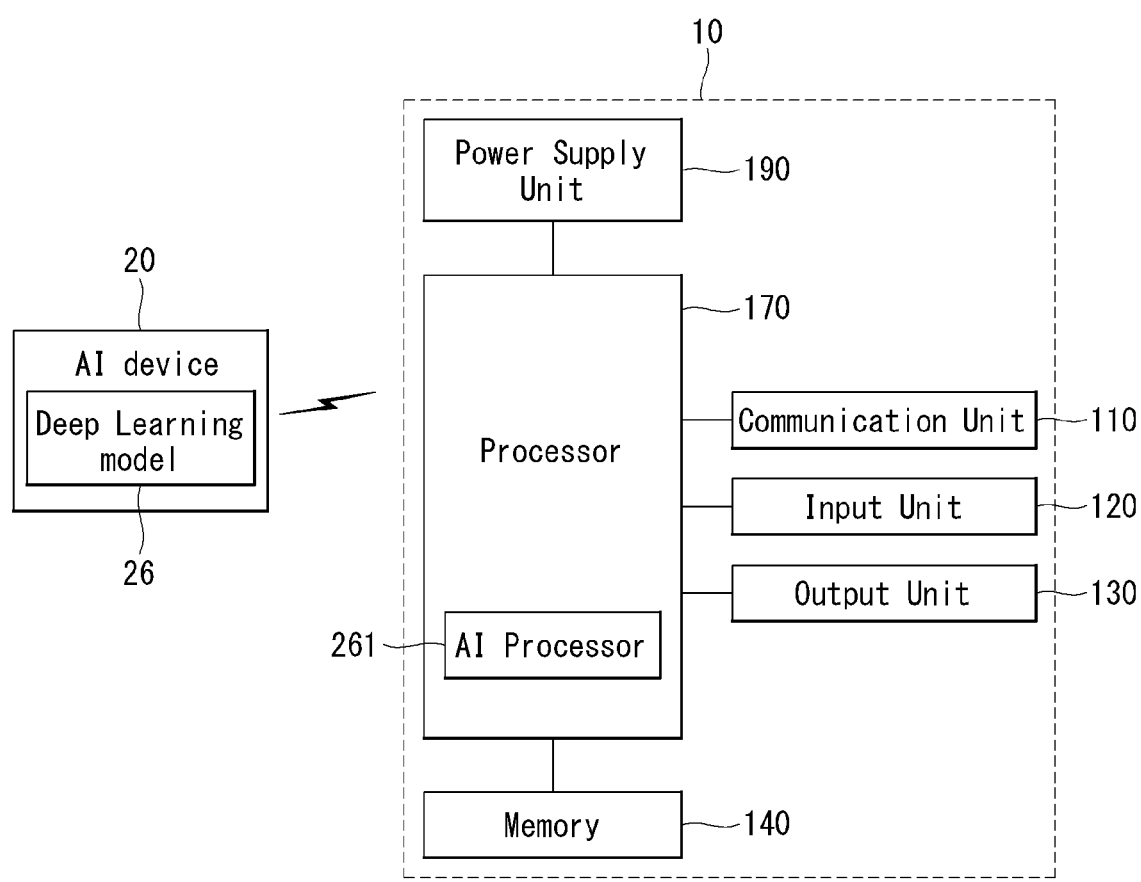
FIG. 6 is a block diagram of an example of an intelligent computing device according to an embodiment of the present disclosure.

FIG. 6 is a block diagram of an example of an intelligent computing device according to an embodiment of the present disclosure.

In an embodiment of the present disclosure, computer-readable and computer-executable instructions may be included in the intelligent computing device 10. FIG. 6 illustrates a plurality of components included in the intelligent computing device 10 only by way of example, but components that are not illustrated in FIG. 6 can be included in the intelligent computing device 10.

An embodiment of the present disclosure may be applied to a plurality of different devices and computer systems, for example, a general purpose computing system, a server-client computing system, a telephone computing system, a laptop computer, a mobile terminal, a PDA, and a tablet computer. The intelligent computing device 10 may also be applied as one component of other devices or systems that provide a voice recognition function, for example, automated teller machines (ATMs), kiosks, global positioning systems (GPSs), home appliances (e.g., refrigerators, ovens, washing machines, etc.), vehicles, and e-book readers.

As illustrated in FIG. 6, the intelligent computing device 10 may include a communication unit 110, an input unit 120, an output unit 130, a memory 140, a power supply unit 190, and/or a processor 170. Some of the components disclosed in the intelligent computing device 10 may be a single component and may appear multiple times in one device.

The intelligent computing device 10 may include an address/data bus (not shown) for transmitting data to the components of the intelligent computing device 10. The respective components in the intelligent computing device 10 may be directly connected to other components via the bus (not shown). The respective components in the intelligent computing device 10 may be directly connected to the processor 170.

The communication unit 110 may include a wireless communication device such as radio frequency (RF), infrared, Bluetooth, and wireless local area network (WLAN) (Wi-Fi, etc.), or a wireless network device such as 5G network, long term evolution (LTE) network, WiMAN network, and 3G network.

The input unit 120 may include a microphone, a touch input unit, a keyboard, a mouse, a stylus, or other input units.

The output unit 130 may output information (e.g., audio) processed by the intelligent computing device 10 or other devices. The output unit 130 may include a speaker, a headphone, or other appropriate components that propagate audio. For another example, the output unit 130 may include an audio output unit. Further, the output unit 130 may include a display (visual display or tactile display), an audio speaker, a headphone, a printer, or other output units. The output unit 130 may be integrated in the intelligent computing device 10, or may be implemented separately from the intelligent computing device 10.

The input unit 120 and/or the output unit 130 may include an interface for connecting external peripherals, such as a universal serial bus (USB), FireWire, thunderbolt, or other connection protocols. The input unit 120 and/or the output unit 130 may include a network connection such as an Ethernet port, modem port, etc. The intelligent computing device 10 may be connected to internet or a distributed computing environment through the input unit 120 and/or the output unit 130. Further, the intelligent computing device 10 may be connected to a removable or external memory (e.g., a removable memory card, memory key drive, network storage, etc.) through the input unit 120 and/or the output unit 130.

The memory 140 may store data and instructions. The memory 140 may include a magnetic storage, an optical storage, a solid-state storage, etc. The memory 140 may include a volatile RAM, a non-volatile ROM, or other memories.

The intelligent computing device 10 may include a processor 170. The processor 170 may be connected to the bus (not shown), the input unit 120, the output unit 130, and/or other components of the intelligent computing device 10. The processor 170 may correspond to a data processing CPU or a data processing memory for storing computer-readable instructions and data.

Computer instructions to be processed by the processor 170 for running the intelligent computing device 10 and its various components may be executed by the processor 170, or stored in the memory 140, an external device, or a memory or storage included in the processor 170 to be described later. Alternatively, all or some of the executable instructions may be added to software and embedded in hardware or firmware. An embodiment of the present disclosure may be implemented by, for example, a variety of combinations of software, firmware, and/or hardware.

Beam Management (BM)

The following functions/operation performed by a 'UE' can be performed by the intelligent computing device 10 described above.

A BM procedure, as layer 1 (L1)/layer 2 (L2) procedures for obtaining and maintaining a set of base station (e.g., gNB, TRP, etc.) and/or terminal (e.g., UE) beams available for downlink (DL) and uplink (UL) transmission/reception, may include the following procedures and terms.

Beam measurement: operation that the base station or the UE measures the characteristics of a received beamformed signal.

Beam determination: operation that the base station or the UE selects its transmit beam (Tx beam)/receive beam (Rx beam).

Beam sweeping: operation that covers a space region using the Tx beam/Rx beam for a predetermined time interval in a predetermined manner.

Beam report: operation that the UE reports information on a beamformed signal based on the beam measurement.

The BM procedure may be divided into (1) a DL BM procedure that uses synchronization signal (SS)/physical broadcast channel (PBCH) block or CSI-RS, and (2) an UL BM procedure that uses a sounding reference signal (SRS). Further, each BM procedure may include Tx beam sweeping for determining the Tx beam and RX beam sweeping for determining the Rx beam.

DL BM Procedure

A DL BM procedure may include (1) a step for a base station to transmit a beamforming DL reference signal (RS) (e.g., CSI-RS or SS block (SSB)), and (2) a step for a UE to transmit a beam reporting.

The beam reporting may include preferred DL RS identifier(s) (ID) and its corresponding L1-reference signal received power (RSRP).

The DL RS ID may be a SSB resource indicator (SSBRI) or a CSI-RS resource indicator (CRI).

Figure 7:
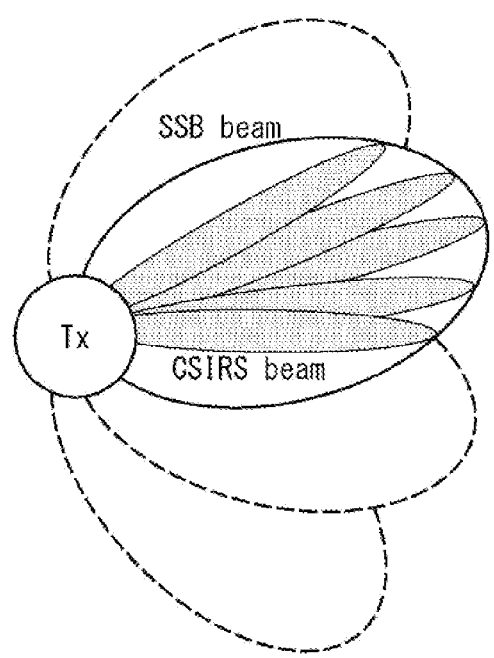
FIG. 7 illustrates an example of beamforming using a SSB and a CSI-RS.

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 1 represents an example of TCI-State IE.

The TCI-State IE associates one or two DL reference signals (RSs) with corresponding quasi co-location (QCL) types.

TABLE 1

```
-- ANS1START
-- TAG-TCI-STATE-START
TCI-State : :=            SEQUENCE {
    tci-StateId                TCI-StateId,
    qcl-Type1                  QCL-Info,
    qcl-Type2                  QCL-Info
    ...
}
QCL-Info : :=             SEQUENCE {
    cell                       ServCellIndex
    bwp-Id                     BWP-Id
    referenceSignal            CHOICE {
        csi-rs                     NZP-CSI-RS-ResourceId,
        ssb                        SSB-Index
    },
    qcl-Type                   ENUMERATED {typeA, typeB, typeC, typeD},
    ...
}
-- TAG-TCI-STATE-STOP
-- ASN1STOP
```

In Table 1, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

Figure 8:
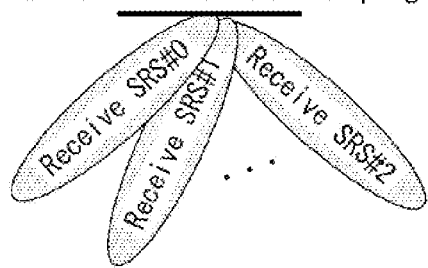
FIG. 8 illustrates an example of a uplink (UL) beam management (BM) procedure using a sounding reference signal (SRS).
Figure 8:
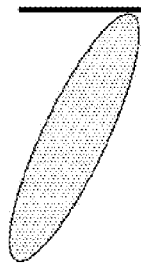
Figure 8:
Figure 8:
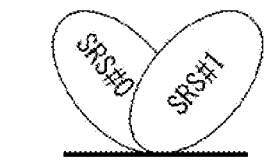

FIG. 8 illustrates an example of an UL BM procedure using a SRS.

More specifically, FIG. 8(a) illustrates an Rx beam determination procedure of a base station, and FIG. 8(b) illustrates a Tx beam sweeping procedure of a UE.

Figure 9:
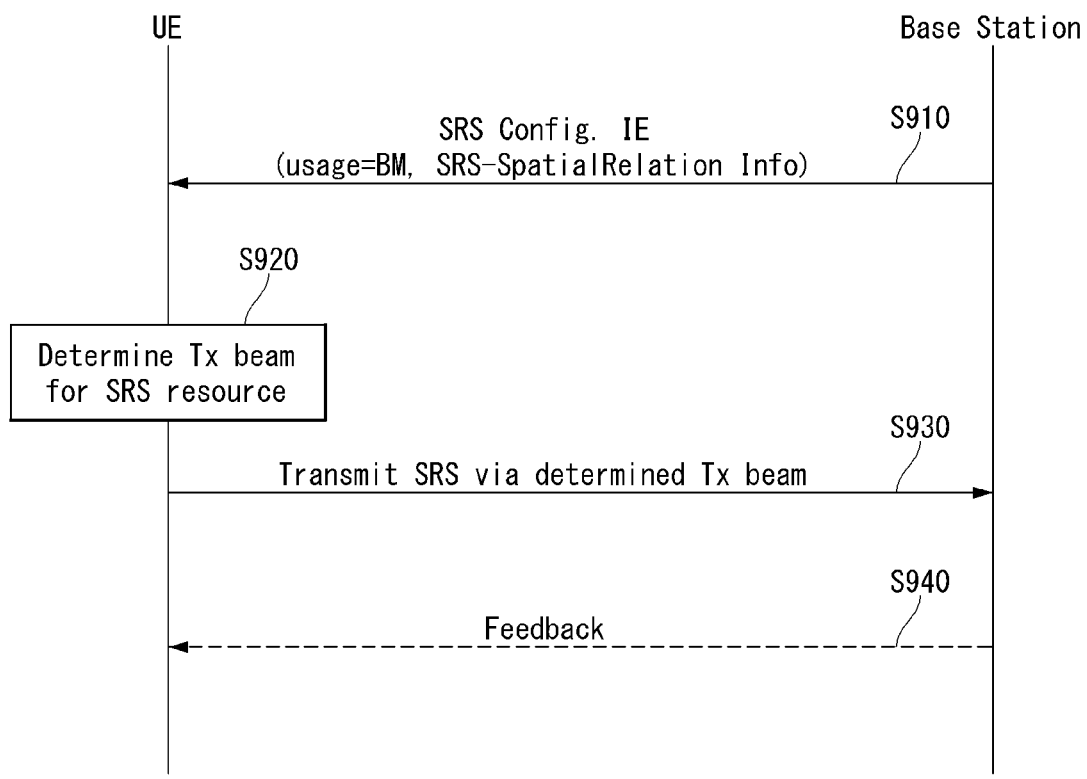
FIG. 9 is a flow chart illustrating an example of a UL BM procedure using a SRS.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 2 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 2

```
-- ASN1START
-- TAG-MAC-CELL-GROUP-CONFIG-START
SRS-Config : :=                              SEQUENCE {
    srs-ResourceSetToReleaseList              SEQUENCE (SIZE(1. .maxNrofSRS-
ResourceSets) ) OF SRS-ResourceSetId         OPTIONAL,     -- Need N
    srs-ResourceSetToAddModList              SEQUENCE (SIZE(1. .maxNrofSRS-
```

TABLE 2-continued

```
ResourceSets) ) OF SRS-ResourceSet            OPTIONAL,     -- Need N
    srs-ResourceToReleaseList                 SEQUENCE (SIZE (1. .maxNrofSRS-
Resources)) OF SRS-ResourceId                 OPTIONAL, -- Need N
    srs-ResourceToAddModList                  SEQUENCE (SIZE(1. .maxNrofSRS-
Resources)) OF SRS-Resource                   OPTIONAL, -- Need. N
    tpc-Accumulation                          ENUMERATED {disabled}
    . . .
}
SRS-ResourceSet : :=                          SEQUENCE {
    srs-ResourceSetId                         SRS-ResourceSetId,
    srs-ResourceIdList                        SEQUENCE (SIZE (1. .maxNrofSRS-
ResourcesPerSet) ) OF SRS-ResourceId          OPTIONAL, -- Cond Setup
    resourceType                              CHOICE {
        aperiodic                             SEQUENCE {
            aperiodicSRS-ResourceTrigger          INTEGER (1. .maxNrofSRS-
TriggerStates-1),
            csi-RS                                NZP-CSI-RS-ResourceId
            slotOffset                            INTEGER (1. .32)
            . . .
        },
        semi-persistent                       SEQUENCE {
            associatedCSI-RS                      NZP-CSI-RS-ResourceId
            . . .
        },
        periodic                              SEQUENCE {
            associatedCSI-RS                      NZP-CSI-RS-ResourceId
            . . .
        }
    },
    usage                                     ENUMERATED {beamManagement,
codebook, nonCodebook, antennaSwitching},
    alpha                                     Alpha
    p0                                        INTEGER (-202. .24)
    pathlossReferenceRS                       CHOICE {
        ssb-Index                             SSB- Index,
        csi-RS-Index                          NZP-CSI-RS-ResourceId
SRS-SpatialRelationInfo : :=                  SEQUENCE {
    servingCellId                             ServCellIndex
    referenceSignal                           CHOICE {
        ssb-Index                             SSB-Index,
        csi-RS-Index                          NZP-CSI-RS-ResourceId,
        srs                                   SEQUENCE {
            resourceId                            SRS-ResourceId,
            uplinkBWP                             BWP-Id
        }
    }
}
SRS-ResourceId : :=                           INTEGER (0. .maxNrofSRS-Resources-1)
```

In Table 2, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to FIG. 8(a) as the usage for the base station to select the Rx beam.

ii) The Spatial_Relation_Info may not be configured for all the SRS resources within the SRS resource set. In this case, the UE may perform transmission while freely changing SRS beams. That is, this case corresponds to FIG. 8(b) as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

Figure 10:
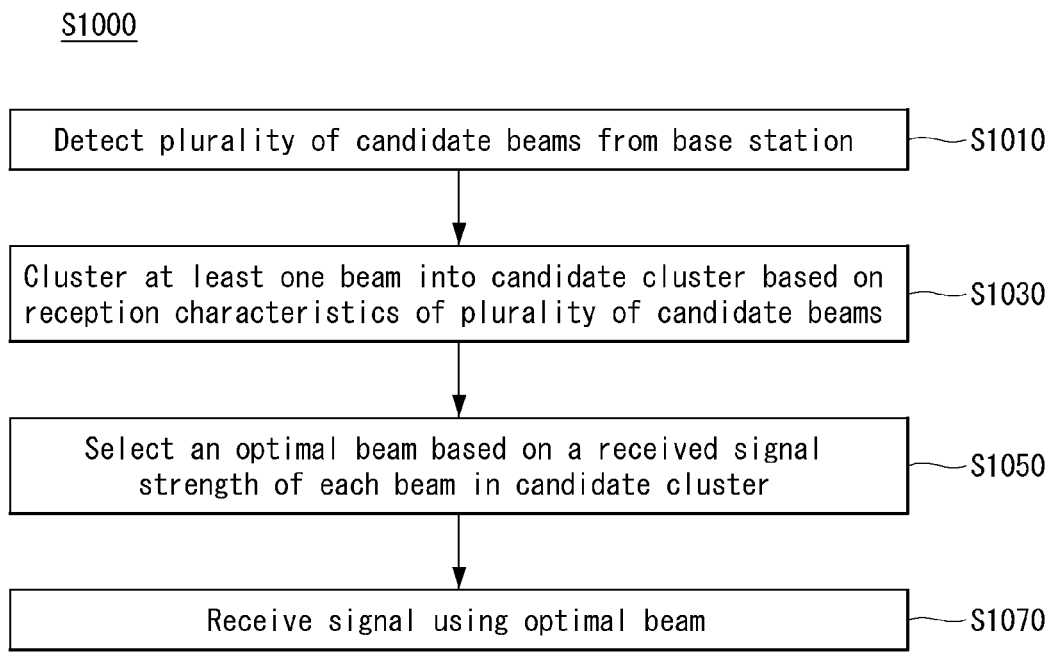
FIG. 10 is a flow chart illustrating a method for intelligently transmitting and receiving a signal by an intelligent computing device according to an embodiment of the present disclosure.

FIG. 10 is a flow chart illustrating a method for intelligently transmitting and receiving a signal by an intelligent computing device according to an embodiment of the present disclosure.

As illustrated in FIG. 10, an intelligent signal transmission/reception method S1000 of an intelligent computing device according to an embodiment of the present disclosure may include steps S1010, S1030, S1050 and S1070. The method S1000 can be performed by the intelligent computing device or the UE described above with reference to FIGS. 1 to 9.

First, the intelligent computing device may detect a plurality of candidate beams transmitted from a base station in S1010. For example, the intelligent computing device may receive, from the base station, information related to a plurality of candidate transmit (Tx) beams transmitted from the base station. The intelligent computing device may identify index information of each of the plurality of candidate Tx beams from the base station based on information related to the plurality of candidate Tx beams.

Subsequently, the intelligent computing device may cluster at least one beam into a candidate cluster based on reception characteristics of the plurality of candidate Tx beams in S1030. The intelligent computing device may check reception characteristics of the plurality of candidate Tx beams received in the step S1010 described above from the intelligent computing device. The reception characteristics of the plurality of candidate Tx beams may include a received signal strength indicator (RSSI), but the present disclosure is not limited thereto. The intelligent computing device may cluster the plurality of candidate Tx beams into at least one candidate cluster by using the reception characteristics of each candidate Tx beam. For example, the intelligent computing device may cluster at least one similar candidate Tx beam, of which a received signal strength is within a predetermined range, into one candidate cluster. For example, the intelligent computing device may determine the number of candidate clusters based on a predetermined condition. For example, the intelligent computing device may learn a movement pattern of the intelligent computing device through the machine learning, and determine the candidate cluster based on the learning result.

Next, the intelligent computing device may select an optimal beam based on a received signal strength of each candidate Tx beam in the candidate cluster in S1050. For example, the intelligent computing device may select, as the optimal beam, one candidate Tx beam with the highest received signal strength among at least one candidate Tx beam included in the candidate cluster.

Finally, the intelligent computing device may receive a signal from the base station using the selected optimal beam in S1070. For example, the intelligent computing device may report information related to the selected optimal beam to the base station, and receive a signal transmitted through the optimal beam from the base station.

Figure 11:
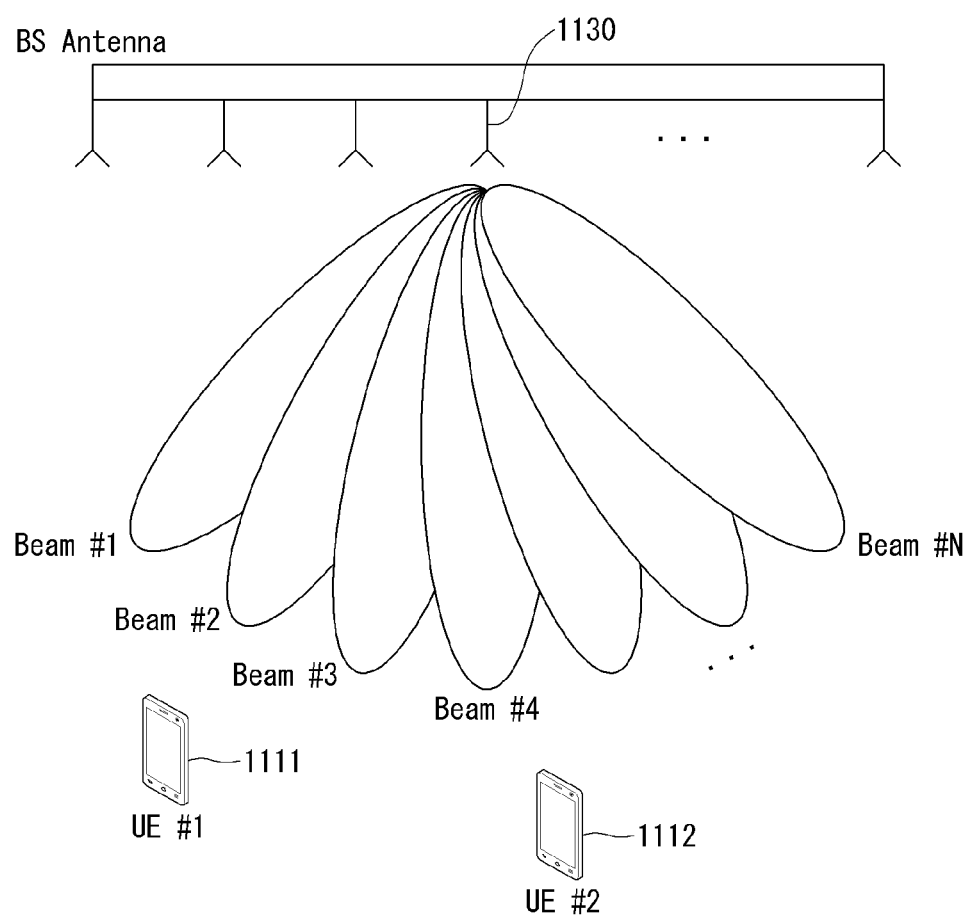
FIG. 11 illustrates a plurality of candidate beams according to an embodiment of the present disclosure.

FIG. 11 illustrates a plurality of candidate beams according to an embodiment of the present disclosure.

As illustrated in FIG. 11, a base station may include a base station antenna, and the base station antennas may include an antenna module 1130.

The base station may transmit/irradiate a plurality of candidate Tx beams (Beam #1, Beam #2, Beam #3, Beam #4, . . . , Beam #N) to a plurality of UEs (e.g., UE #1 and UE #2) 1111 and 1112. Each UE may be the intelligent computing device described above with reference to FIGS. 1 to 10.

Each of the intelligent computing devices 1111 and 1112 may cluster only some of the detected candidate Tx beams into a candidate cluster. Subsequently, the intelligent computing device may measure a received signal strength of the candidate Tx beam in the candidate cluster, and select an optimal beam with the highest received signal strength from among the candidate Tx beams in the candidate cluster based on the measurement result. Subsequently, the intelligent computing device may transmit information related to the optimal beam to the base station, and receive a signal from the base station through the optimal beam.

Figure 12:
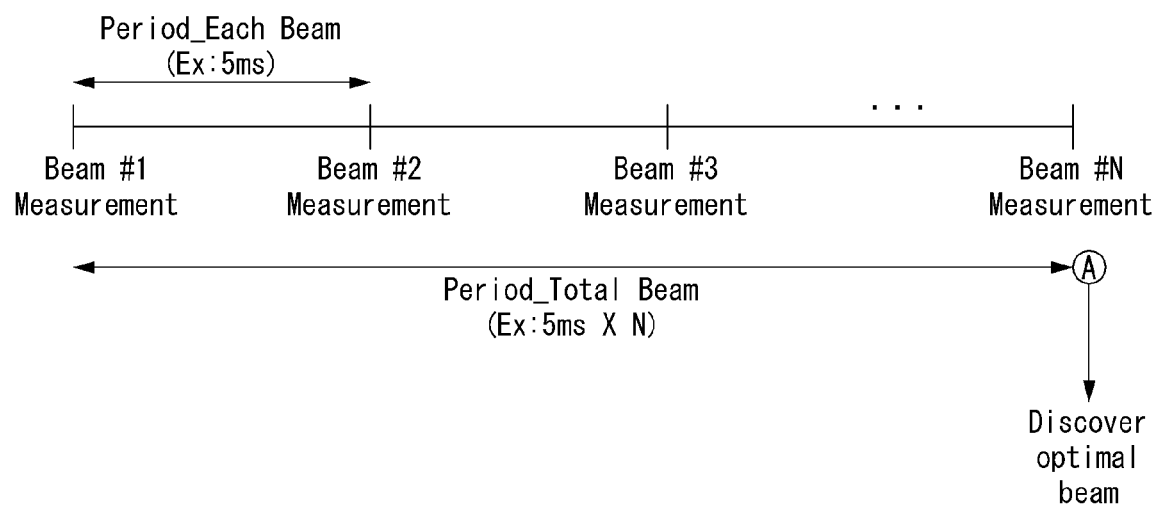
FIG. 12 illustrates an example where an intelligent computing device detects/measures a candidate beam in accordance with a related art.

FIG. 12 illustrates an example where an intelligent computing device detects/measures a candidate beam in accordance with a related art.

As illustrated in FIG. 12, according to the related art, an intelligent computing device may detect/measure a received signal strength of each of a plurality of candidate Tx beams (Beam #1, Beam #2, Beam #3, . . . , Beam #N). For example, the intelligent computing device may detect/measure each of the plurality of candidate Tx beams every a predetermined period. For example, the predetermined period may be 5 ms. For example, if the number of candidate Tx beams is N, there is a problem that it takes N*5 ms, which is N times 5 ms, for the intelligent computing device to detect/measure the plurality of candidate Tx beams.

On the other hands, according to an embodiment of the present disclosure, the intelligent computing device can reduce time required to measure a received signal strength of the beam by measuring only some clustered candidate Tx beams of the plurality of candidate Tx beams not all the plurality of candidate Tx beams.

Figure 13:
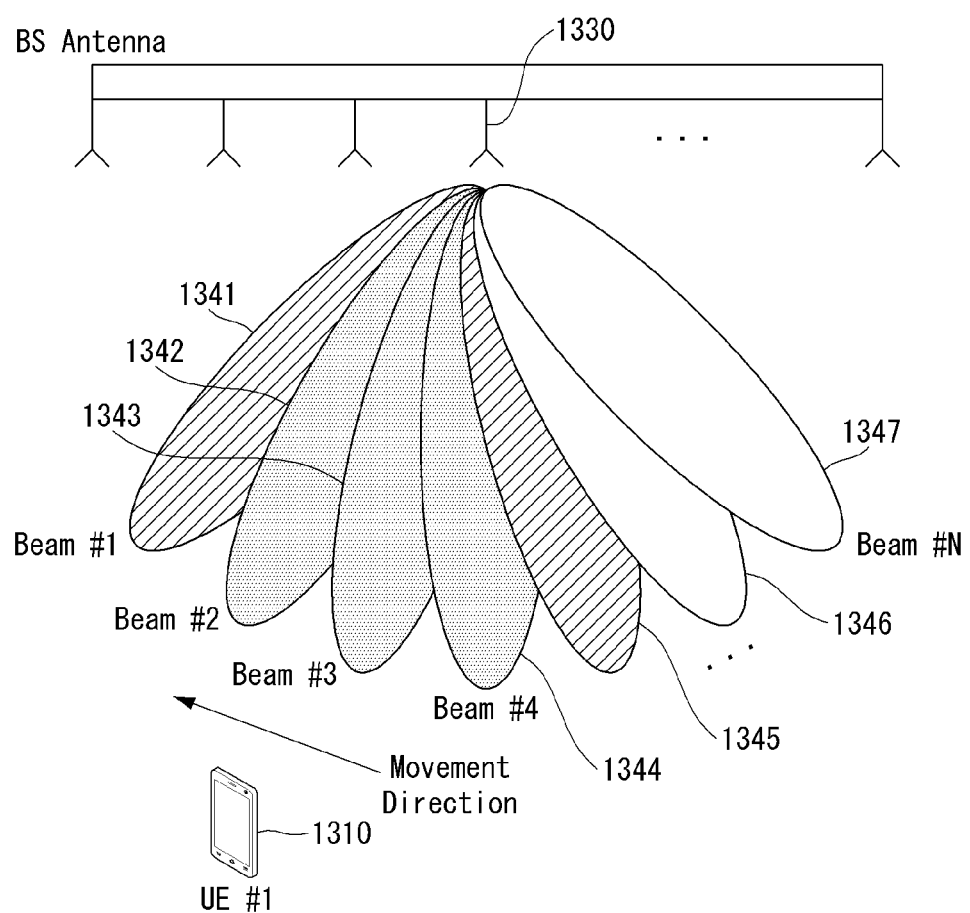
FIG. 13 illustrates a candidate cluster according to an embodiment of the present disclosure.

FIG. 13 illustrates a candidate cluster according to an embodiment of the present disclosure.

As illustrated in FIG. 13, an intelligent computing device (UE #1) 1310 may detect a plurality of candidate Tx beams (1341, 1342, 1343, 1344, 1345, 1345, 1346, 1347) (Beam #1, Beam #2, Beam #3, Beam #4, Beam #5, . . . , Beam #N) irradiated by a base station antenna 1330, and cluster only at least one candidate Tx beam (1342, 1343, 1344) (Beam #2, Beam #3, Beam #4) among the plurality of candidate Tx beams, of which reception characteristics are equal to or greater than a threshold, to generate a candidate cluster. The intelligent computing device may periodically measure a received signal strength only for candidate Tx beams included in the candidate cluster.

The intelligent computing device may monitor two candidate Tx beams (1341, 1345) (Beam #1, Beam #N) adjacent to the candidate cluster, and include the two candidate Tx beams in the candidate cluster when reception characteristics of the two candidate Tx beams are equal to or greater than a threshold.

For example, the intelligent computing device may select a candidate Tx beam with a highest received signal strength as an optimal beam. For another example, the intelligent computing device may set a candidate sub-cluster in which a change in the received signal strength per unit time in the candidate cluster is equal to or less than a threshold, and may select a candidate Tx beam with a highest received signal strength in the candidate sub-cluster as an optimal beam.

The intelligent computing device detects again the plurality of candidate Tx beams when all the candidate Tx beams included in the candidate cluster are not measured, and repeats the above process.

Figure 14:
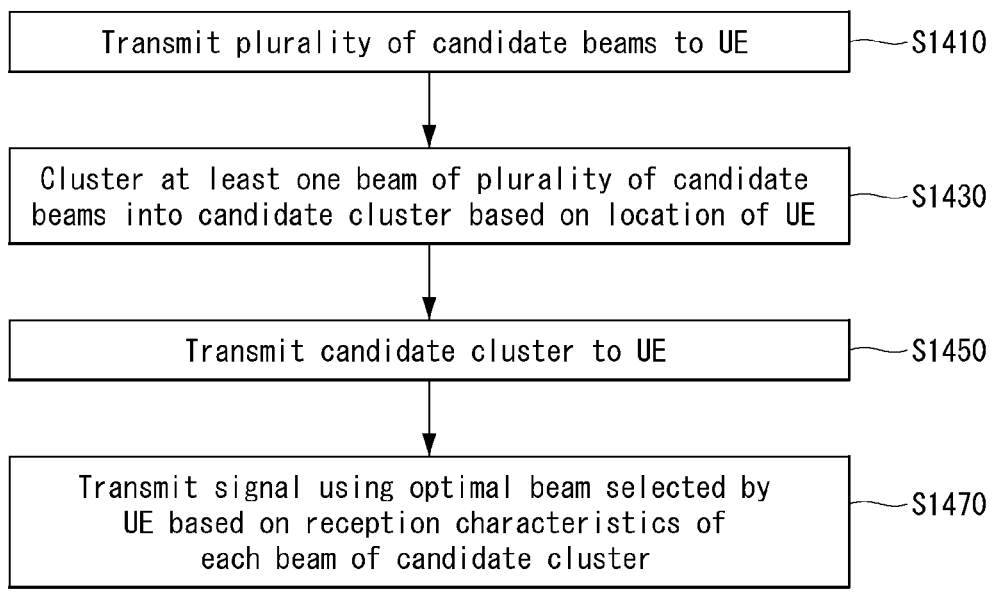
FIG. 14 is a flow chart illustrating a method for intelligently transmitting a signal by a base station according to another embodiment of the present disclosure.

FIG. 14 is a flow chart illustrating a method for intelligently transmitting a signal by a base station according to another embodiment of the present disclosure.

As illustrated in FIG. 14, an intelligent signal transmission method S1400 of a base station may include steps S1410, S1430, S1450 and S1470, and may be performed by the base station described above with reference to FIGS. 1 to 13. A UE is the same as the intelligent computing device described above with reference to FIGS. 1 to 13.

First, the base station may transmit a plurality of candidate beams to the UE in S1410.

Subsequently, the base station may cluster at least one beam of the plurality of candidate beams into a candidate cluster based on a location of the UE in S1430. For example, the base station may receive a GPS signal of each UE from each of the plurality of UEs that are communication-connected to the base station, and determine a location of each UE based on the GPS signal of each UE. The base station may cluster a predetermined number of candidate beams, that are close to the location of each UE, among the plurality of candidate beams in the candidate cluster.

Next, the base station may transmit information related to the candidate cluster to the UE in S1450.

Finally, the base station may obtain information related to an optimal beam selected by the UE based on reception characteristics of each beam of the candidate cluster, and transmit a signal to the UE using the optimal beam in S1470.

Figure 15:
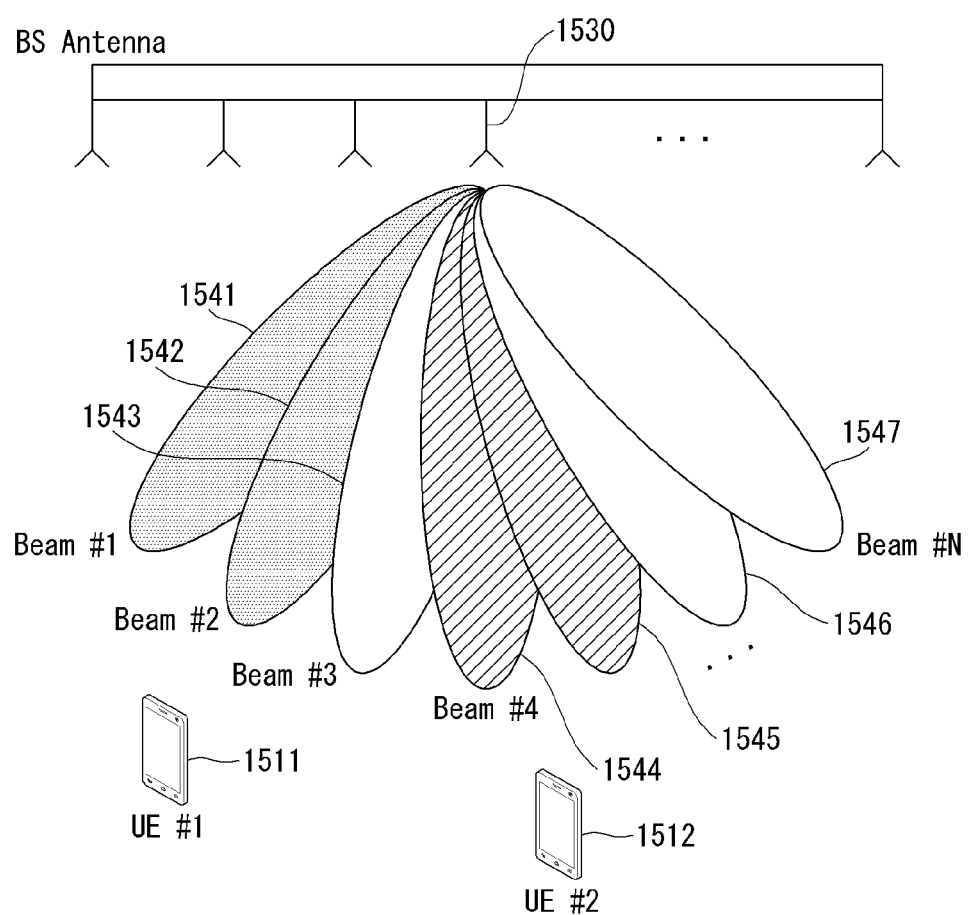
FIG. 15 illustrates a process for a base station to configure a candidate cluster according to a method illustrated in FIG. 14.

FIG. 15 illustrates a process for a base station to configure a candidate cluster according to the method illustrated in FIG. 14.

As illustrated in FIG. 15, the base station may irradiate a plurality of candidate Tx beams (1541, 1542, 1543, 1544, 1545, 1546, 1547) (Beam #1, Beam #2, Beam #3, Beam #4, Beam #5, Beam #N) using a base station antenna 1530.

Subsequently, the base station may receive a GPS signal of a UE #1 (1511) from the UE #1 (1511). The base station may also receive a GPS signal of a UE #2 (1512) from the UE #2 (1512).

Next, the base station may configure, as a first candidate cluster, two candidate Tx beams (1541, 1542) (Beam #1, Beam #2) that are relatively close to a location of the UE #1 among the plurality of candidate Tx beams based on the GPS signal of the UE #1, and transmit information related to the first candidate cluster to the UE #1. In the same manner, the base station may configure, as a second candidate cluster, two candidate Tx beams (1544, 1545) (Beam #4, Beam #5) that are relatively close to a location of the UE #2 among the plurality of candidate Tx beams based on the GPS signal of the UE #2, and transmit information related to the first candidate cluster to the UE #2.

In this case, the UE #1 may select one optimal beam based on a received signal strength of each of the beams 1541 and 1542 in the first candidate cluster and report it to the base station. Further, the UE #2 may select one optimal beam based on a received signal strength of each of the beams 1544 and 1545 in a second candidate cluster and report it to the base station.

Subsequently, the base station may transmit the signal to each UE using each optimal beam reported by the UE #1 and the UE #2.

Figure 16:
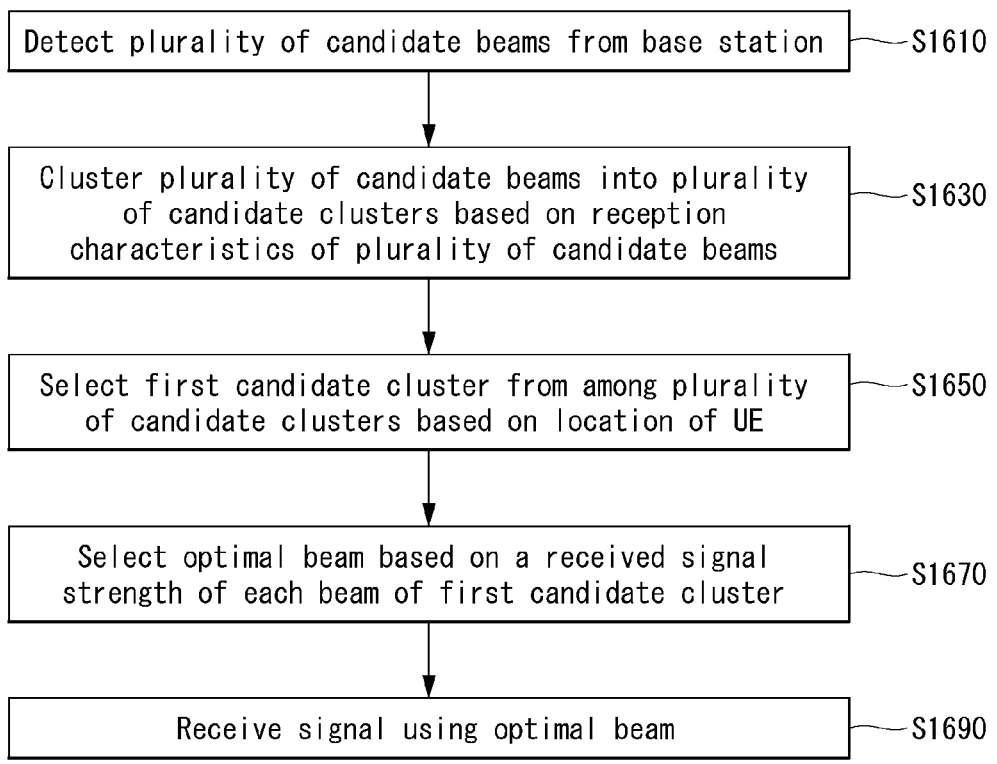
FIG. 16 is a flow chart illustrating a signal reception method of an intelligent computing device according to another embodiment of the present disclosure.

FIG. 16 is a flow chart illustrating a signal reception method of an intelligent computing device according to another embodiment of the present disclosure.

As illustrated in FIG. 16, according to another embodiment of the present disclosure, an intelligent computing device may detect a plurality of candidate beams from a base station in S1610.

Subsequently, the intelligent computing device may cluster the plurality of candidate beams into a plurality of candidate clusters based on reception characteristics of the plurality of candidate beams in S1630. Unlike the embodiment in which one candidate cluster is generated as described with reference to FIGS. 10 to 13, with reference to FIG. 16, the intelligent computing device may cluster the plurality of candidate beams into the plurality of candidate clusters.

Next, the intelligent computing device may select a first candidate cluster from among the plurality of candidate clusters based on a location of a UE (intelligent computing device) in S1650. For example, the intelligent computing device may select the first candidate cluster, that is closest to a location of the intelligent computing device, from among the plurality of candidate clusters.

Subsequently, the intelligent computing device may select an optimal beam based on a received signal strength of each beam of the first candidate cluster in S1670, and may receive a signal from the base station using the optimal beam in S1690.

Figure 17:
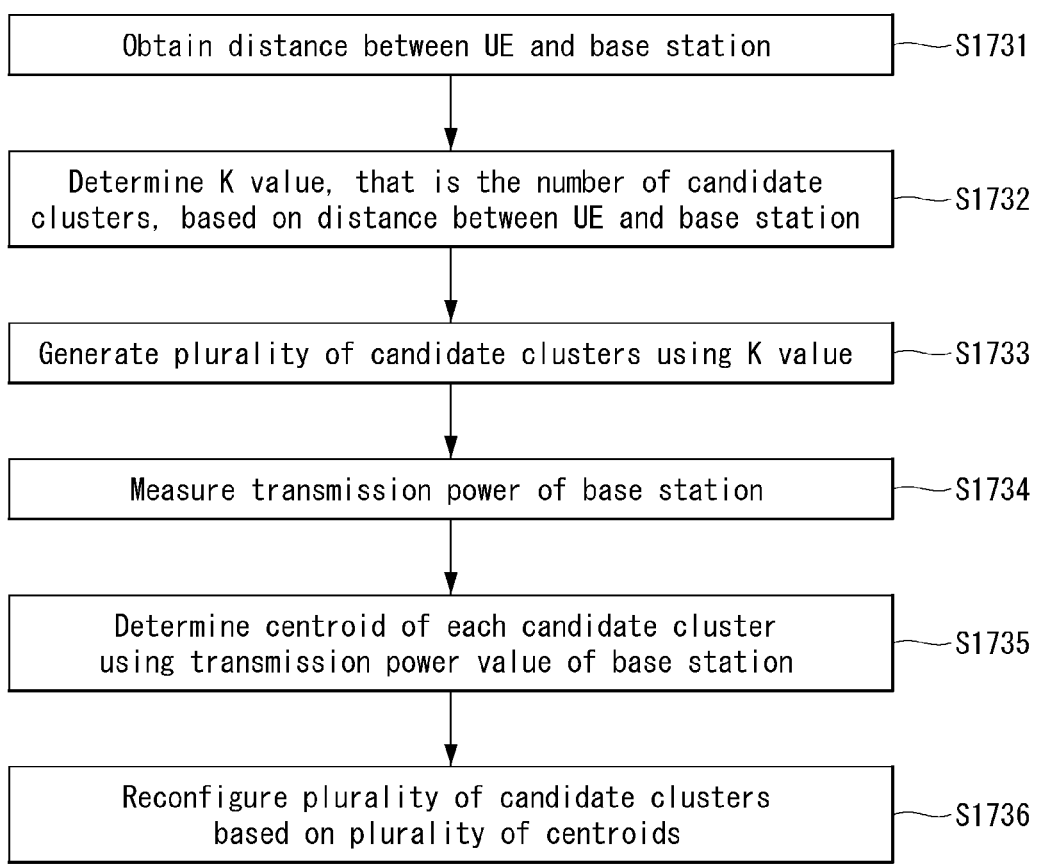
FIG. 17 is a flow chart illustrating a method for generating/reconfiguring a candidate cluster according to an embodiment of the present disclosure.

FIG. 17 is a flow chart illustrating a method for generating/reconfiguring a candidate cluster according to an embodiment of the present disclosure.

As illustrated in FIG. 17, according to an embodiment of the present disclosure, an intelligent computing device may obtain a distance between a UE (intelligent computing device) and a base station in S1731.

Subsequently, the intelligent computing device may determine K value, that is the number of candidate clusters, based on the distance between the UE and the base station in S1732. For example, the intelligent computing device may determine the K value as a relatively large value when the distance between the UE and the base station is relatively large, and determine the K value as a relatively small value when the distance between the UE and the base station is relatively small, and vice versa. However, the present disclosure is not limited thereto.

Next, the intelligent computing device may generate a plurality of candidate clusters using the K value in S1733.

Subsequently, the intelligent computing device may measure transmission power of the base station in S1734.

Next, the intelligent computing device may determine a centroid of each candidate cluster using a transmission power value of the base station in S1735. For example, the intelligent computing device may set a centroid of each candidate cluster to be relatively high when the transmission power value of the base station is relatively large, and set a centroid of each candidate cluster to be relatively low when the transmission power value of the base station is relatively small, and vice versa. However, the present disclosure is not limited thereto.

Subsequently, the intelligent computing device may reconfigure a plurality of candidate clusters based on the plurality of centroids in S1736.

Embodiments

Embodiment 1: a method for intelligently transmitting and receiving a signal may comprise detecting a plurality of candidate beams irradiated from a base station; clustering at least one of the plurality of candidate beams into at least one candidate cluster using a clustering algorithm; selecting an optimal beam based on a received signal strength of each candidate beam in the at least one candidate cluster; and receiving a signal using the optimal beam.

Embodiment 2: in the embodiment 1, the clustering may comprise clustering the at least one candidate beam into the at least one candidate cluster based on reception characteristics of each of the plurality of candidate beams.

Embodiment 3: in the embodiment 2, the reception characteristics may include a received signal strength indicator (RSSI).

Embodiment 4: in the embodiment 1, the clustering may comprise determining a K value, that is the number of candidate clusters, based on a distance between the intelligent computing device and the base station, and generating at least one candidate cluster from among the K candidate clusters based on a location of the intelligent computing device.

Embodiment 5: in the embodiment 4, the method may further comprise measuring transmission power of the base station; determining a centroid of the at least one candidate cluster using a transmission power value of the base station; and reconfiguring at least one candidate cluster based on the determined centroid.

Embodiment 6: in the embodiment 1, the method may further comprise monitoring candidate beams adjacent to the at least one candidate cluster; and allowing the adjacent candidate beams to be included in the at least one candidate cluster based on the monitoring result.

Embodiment 7: an intelligent computing device for intelligently receiving a signal from a base station comprises a communication unit configured to detect a plurality of candidate beams irradiated from the base station; and a processor configured to cluster at least one of the plurality of candidate beams into at least one candidate cluster using a clustering algorithm, select an optimal beam based on a received signal strength of each candidate beam in the at least one candidate cluster, and receive a signal using the optimal beam.

Embodiment 8: in the embodiment 7, the processor may be configured to cluster the at least one candidate beam into the at least one candidate cluster based on reception characteristics of each of the plurality of candidate beams.

Embodiment 9: in the embodiment 8, the reception characteristics may include a received signal strength indicator (RSSI).

Embodiment 10: in the embodiment 7, the processor may be configured to determine a K value, that is the number of candidate clusters, based on a distance between the intelligent computing device and the base station, and generate at least one candidate cluster from among the K candidate clusters based on a location of the intelligent computing device.

Embodiment 11: in the embodiment 10, the processor may be configured to measure transmission power of the base station, determine a centroid of the at least one candidate cluster using a transmission power value of the base station, and reconfigure at least one candidate cluster based on the determined centroid.

Embodiment 12: in the embodiment 7, the processor may be configured to monitor candidate beams adjacent to the at least one candidate cluster, and allow the adjacent candidate beams to be included in the at least one candidate cluster based on the monitoring result.

Embodiment 13: a method for a base station to intelligently transmit a signal to a UE comprises irradiating a plurality of candidate beams to the UE; clustering at least one of the plurality of candidate beams into a candidate cluster based on a location of the UE; transmitting, to the UE, information related to the candidate cluster; and transmitting the signal to the UE through an optimal beam selected by the UE based on reception characteristics of each candidate beam of the candidate cluster.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A method for an intelligent computing device to receive a signal from a base station, the method comprising:
    detecting a plurality of candidate beams irradiated from the base station;
    clustering at least one of the plurality of candidate beams into at least one candidate cluster;
    measuring received signal strengths of each candidate beam in the at least one candidate cluster;
    selecting an optimal beam based on the received signal strengths of each candidate beam in the at least one candidate cluster; and
    receiving a signal using the optimal beam,
    measuring a transmission power of the base station;
    determining a centroid of the at least one candidate cluster using the transmission power of the base station; and
    reconfiguring the at least one candidate cluster based on the determined centroid.

2. The method of claim 1, wherein the clustering comprises clustering the at least one candidate beam into the at least one candidate cluster based on reception characteristics of each of the plurality of candidate beams.

3. The method of claim 2, wherein the reception characteristics include a received signal strength indicator (RSSI).

4. The method of claim 1, wherein the clustering comprises:
    determining a K value representing a number of candidate clusters based on a distance between the intelligent computing device and the base station; and
    generating the at least one candidate cluster from among the K number of candidate clusters based on a location of the intelligent computing device.

5. The method of claim 1, further comprising:
    monitoring candidate beams adjacent to the at least one candidate cluster; and
    allowing the adjacent candidate beams to be included in the at least one candidate cluster based on the monitoring result.

6. An intelligent computing device for receiving a signal from a base station, the intelligent computing device comprising:
- a transceiver configured to detect a plurality of candidate beams irradiated from the base station; and
- a processor configured to:
- cluster at least one of the plurality of candidate beams into at least one candidate cluster;
- measure received signal strengths of each candidate beam in the at least one candidate cluster;
- select an optimal beam based on the received signal strengths of each candidate beam in the at least one candidate cluster; and
- receive a signal using the optimal beam,
- measuring a transmission power of the base station;
- determining a centroid of the at least one candidate cluster using the transmission power of the base station; and
- reconfiguring the at least one candidate cluster based on the determined centroid.

7. The intelligent computing device of claim 6, wherein the processor is further configured to cluster the at least one candidate beam into the at least one candidate cluster based on reception characteristics of each of the plurality of candidate beams.

8. The intelligent computing device of claim 7, wherein the reception characteristics include a received signal strength indicator (RSSI).

9. The intelligent computing device of claim 6, wherein the processor is further configured to:
- determine a K value representing a number of candidate clusters based on a distance between the intelligent computing device and the base station; and
- generate the at least one candidate cluster from among the K number of candidate clusters based on a location of the intelligent computing device.

10. The intelligent computing device of claim 6, wherein the processor is further configured to:
- monitor candidate beams adjacent to the at least one candidate cluster; and
- allow the adjacent candidate beams to be included in the at least one candidate cluster based on the monitoring result.

* * * * *